Nov. 7, 1950 E. B. NOLT 2,528,538
TYING MECHANISM FOR AUTOMATIC BALERS
Filed May 29, 1944 9 Sheets-Sheet 9
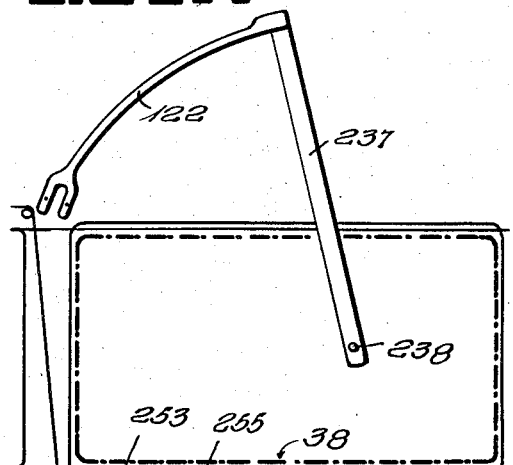
FIG_40
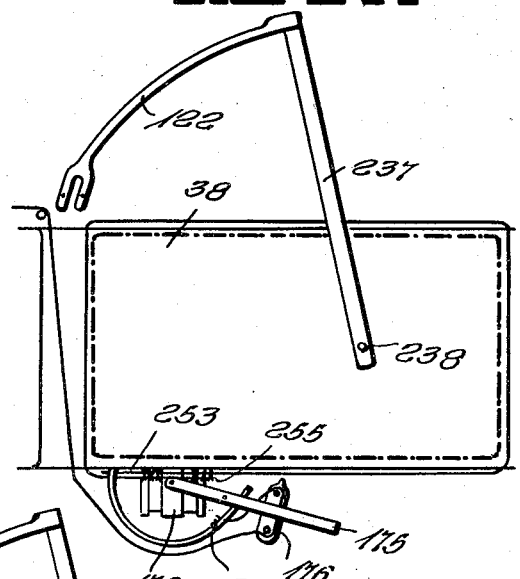
FIG_41
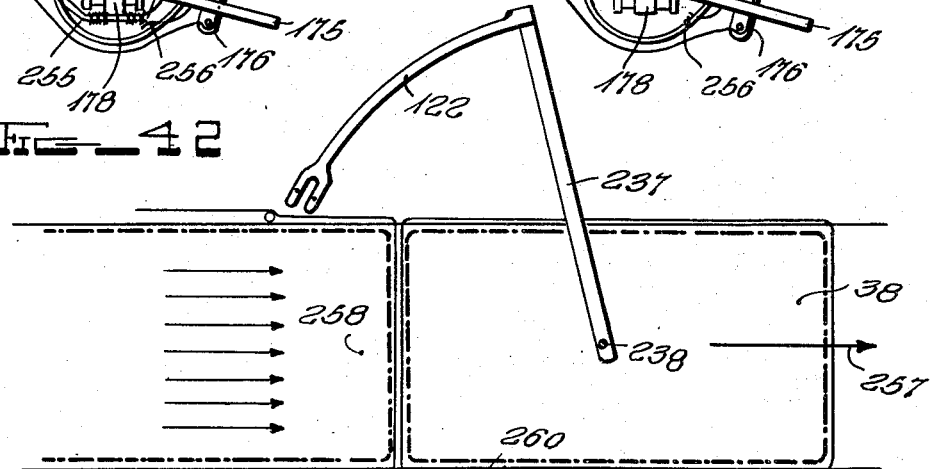
FIG_42
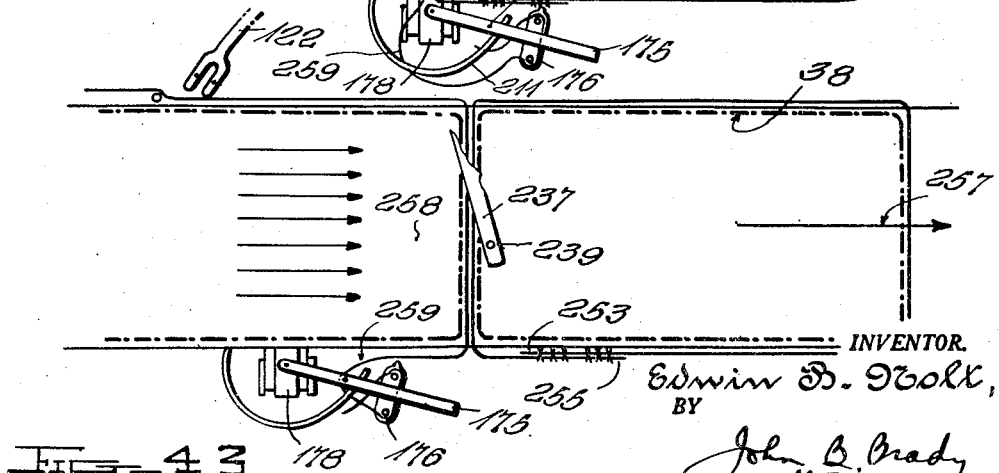
FIG_43
INVENTOR.
Edwin B. Nolt,
BY
John B. Brady
attorney Patented Nov. 7, 1950

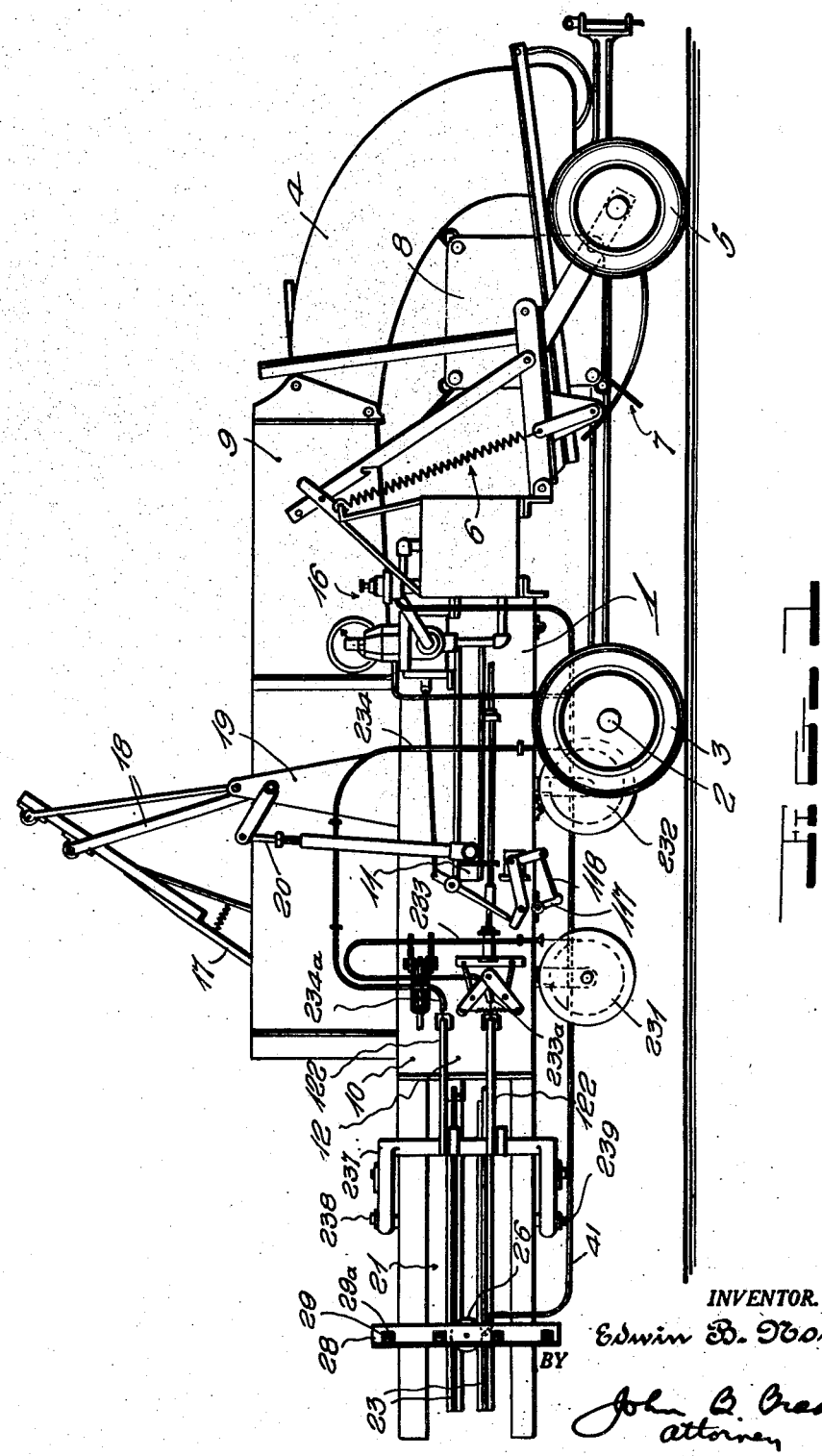

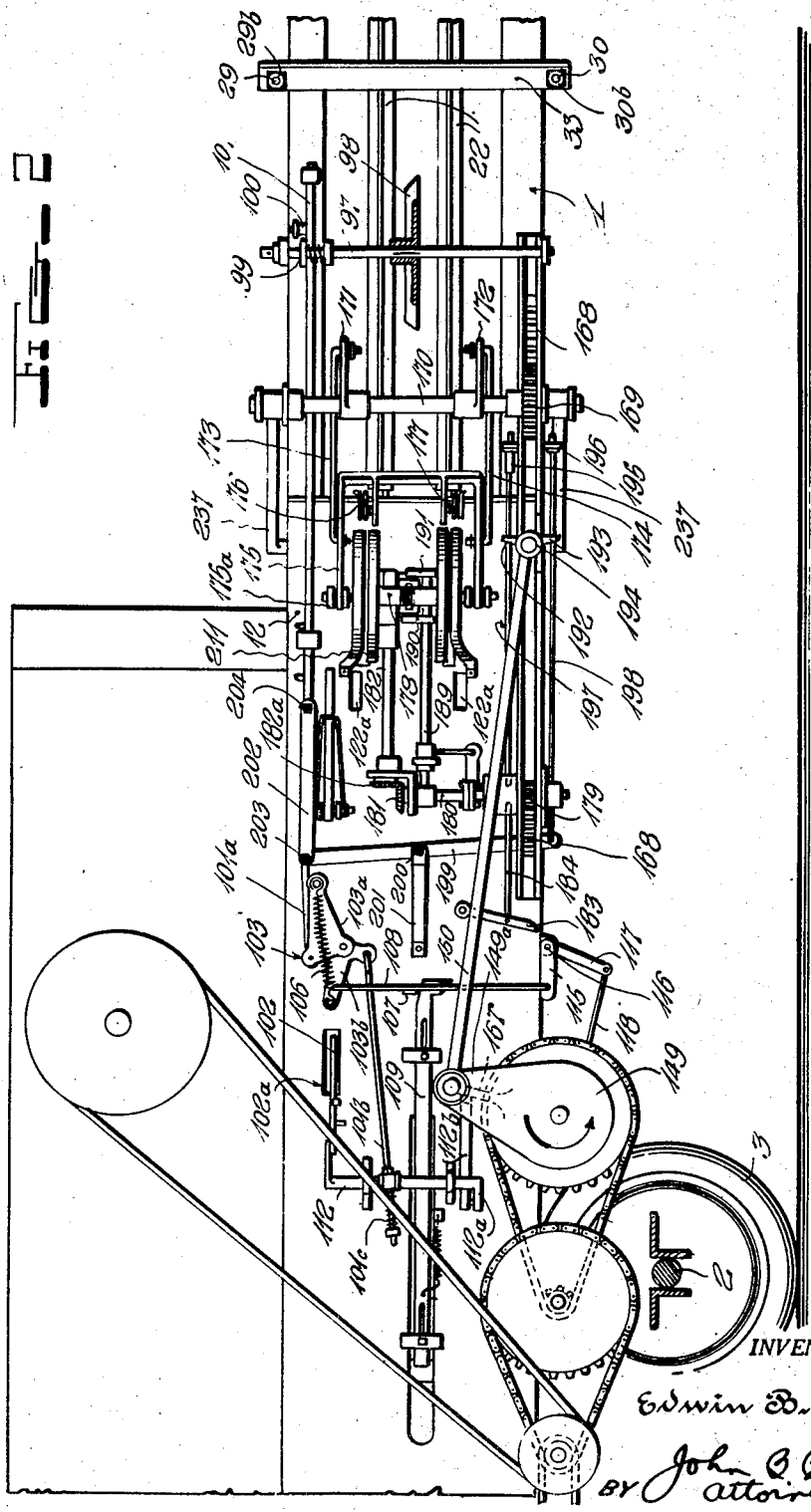

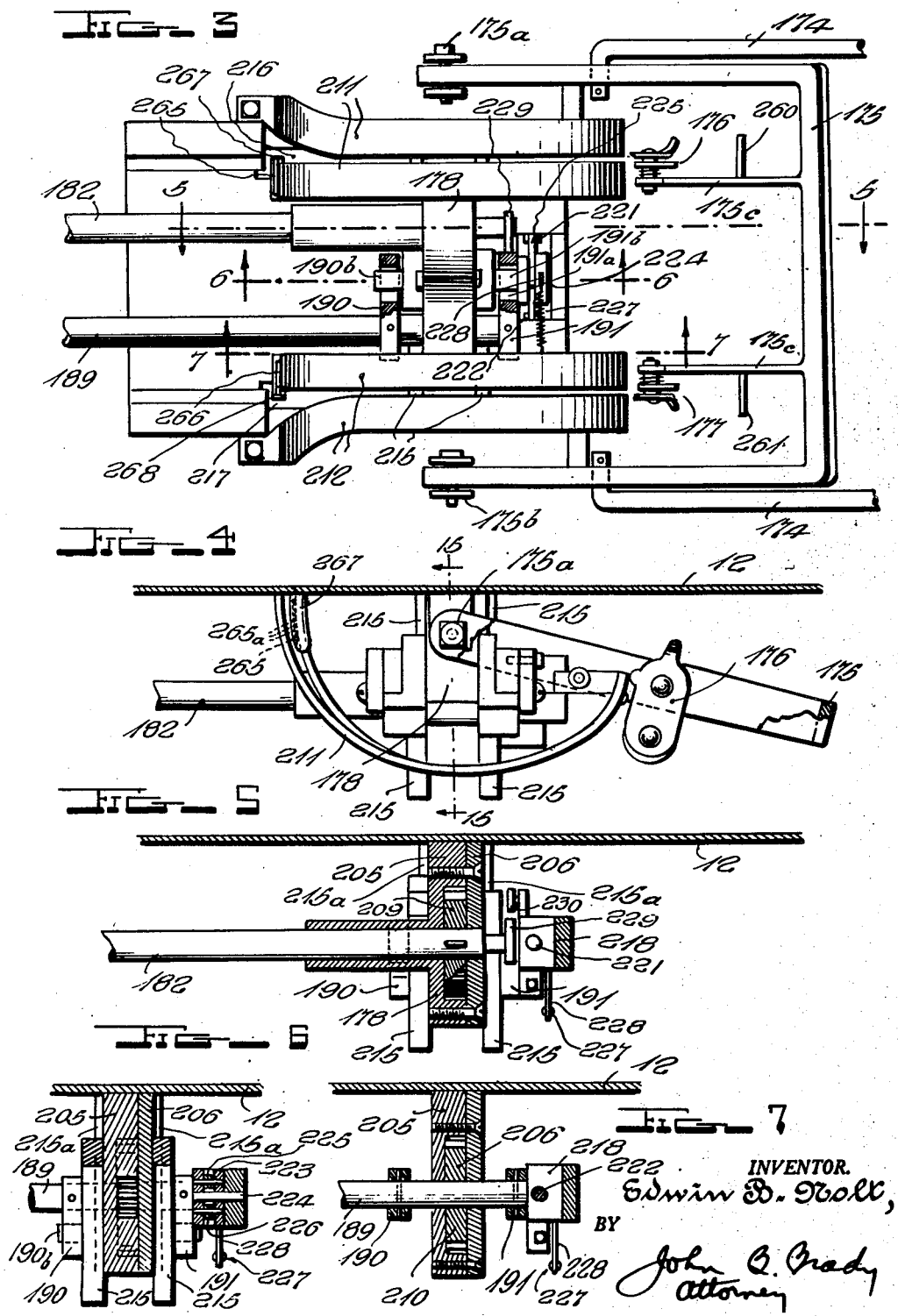

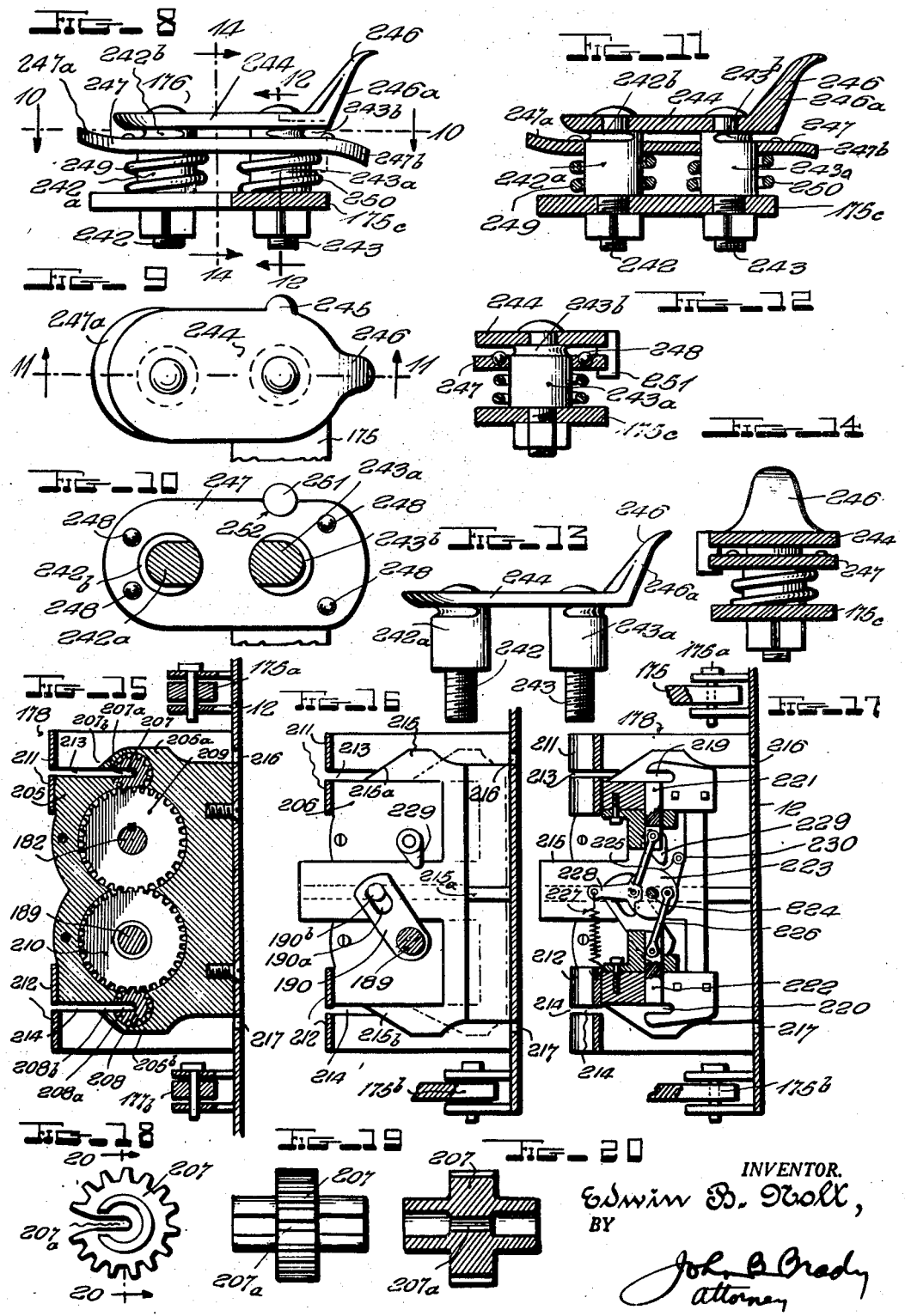

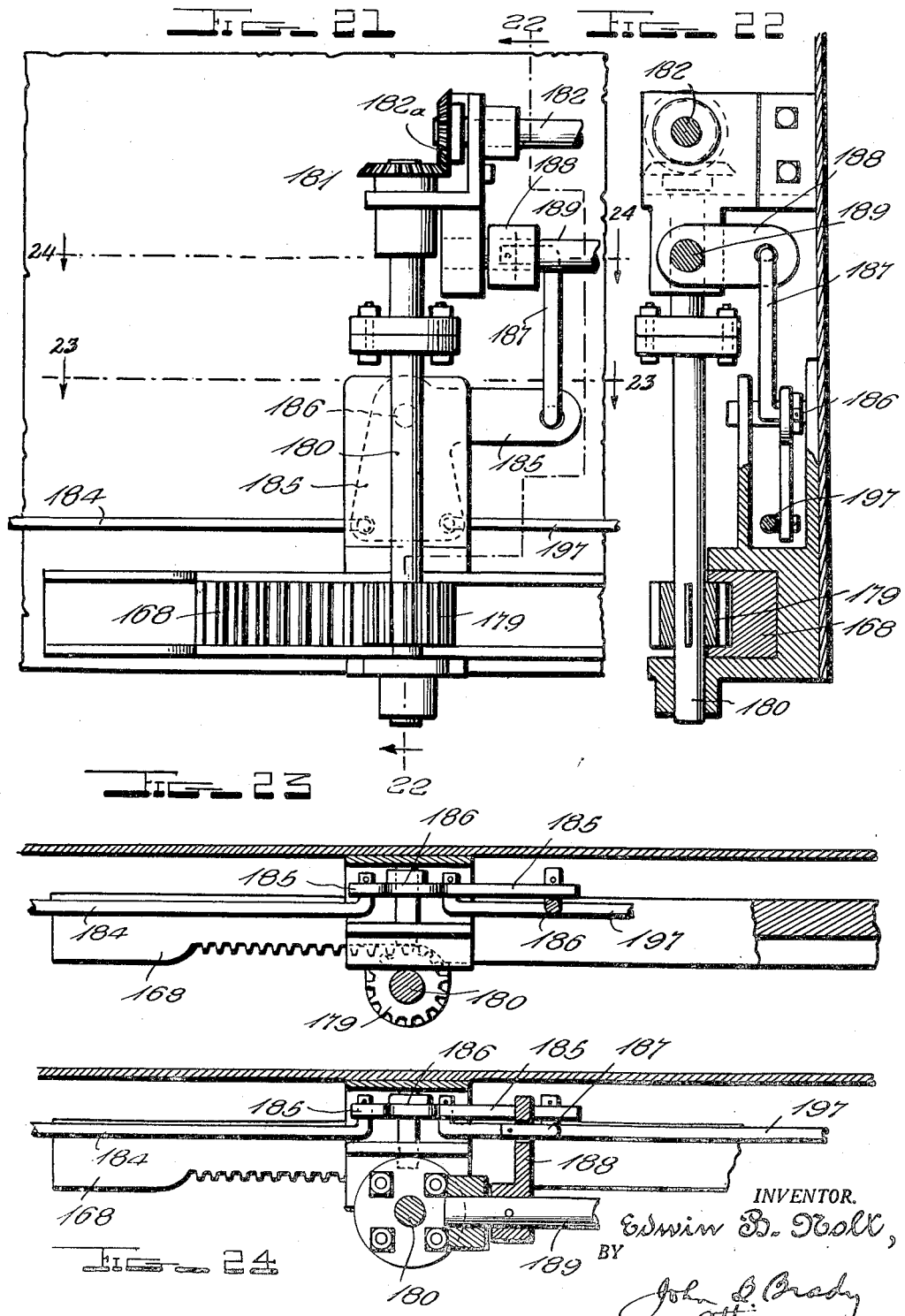

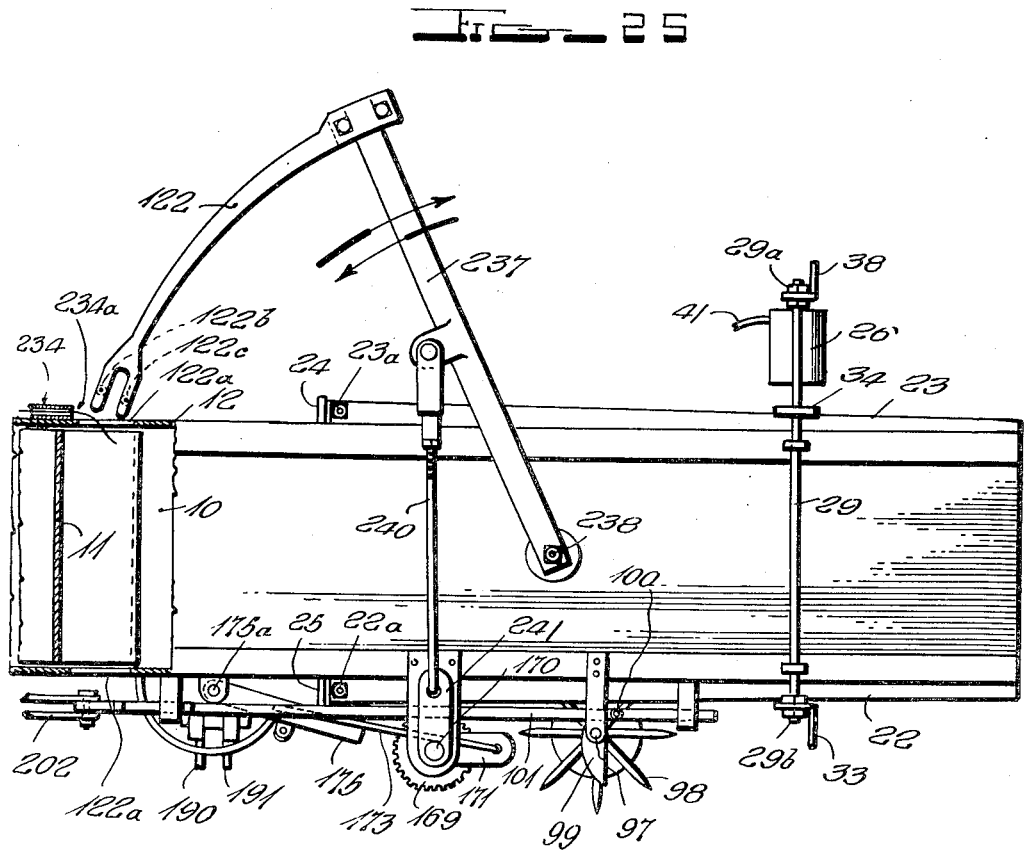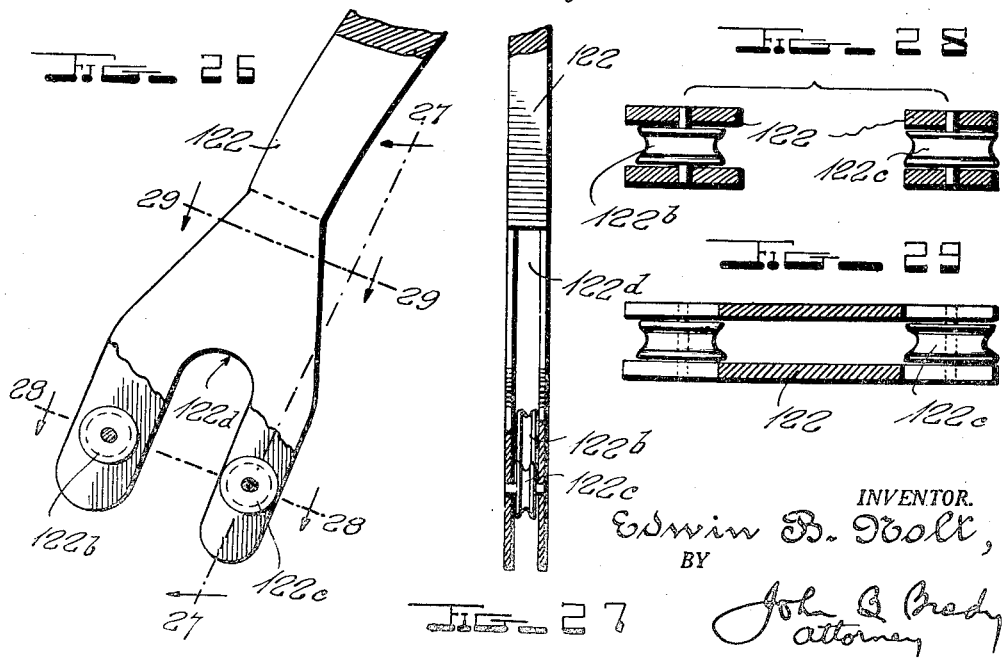

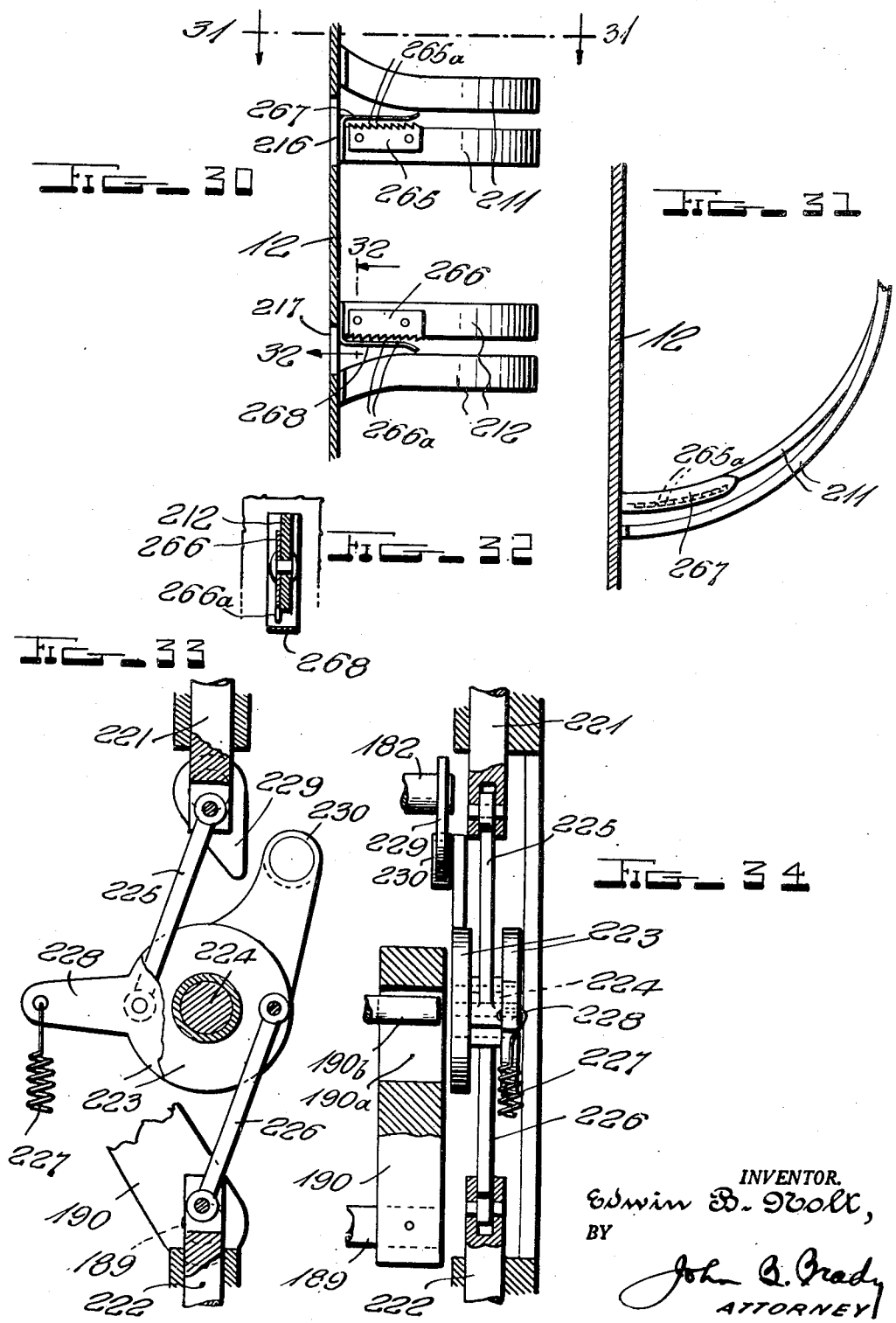

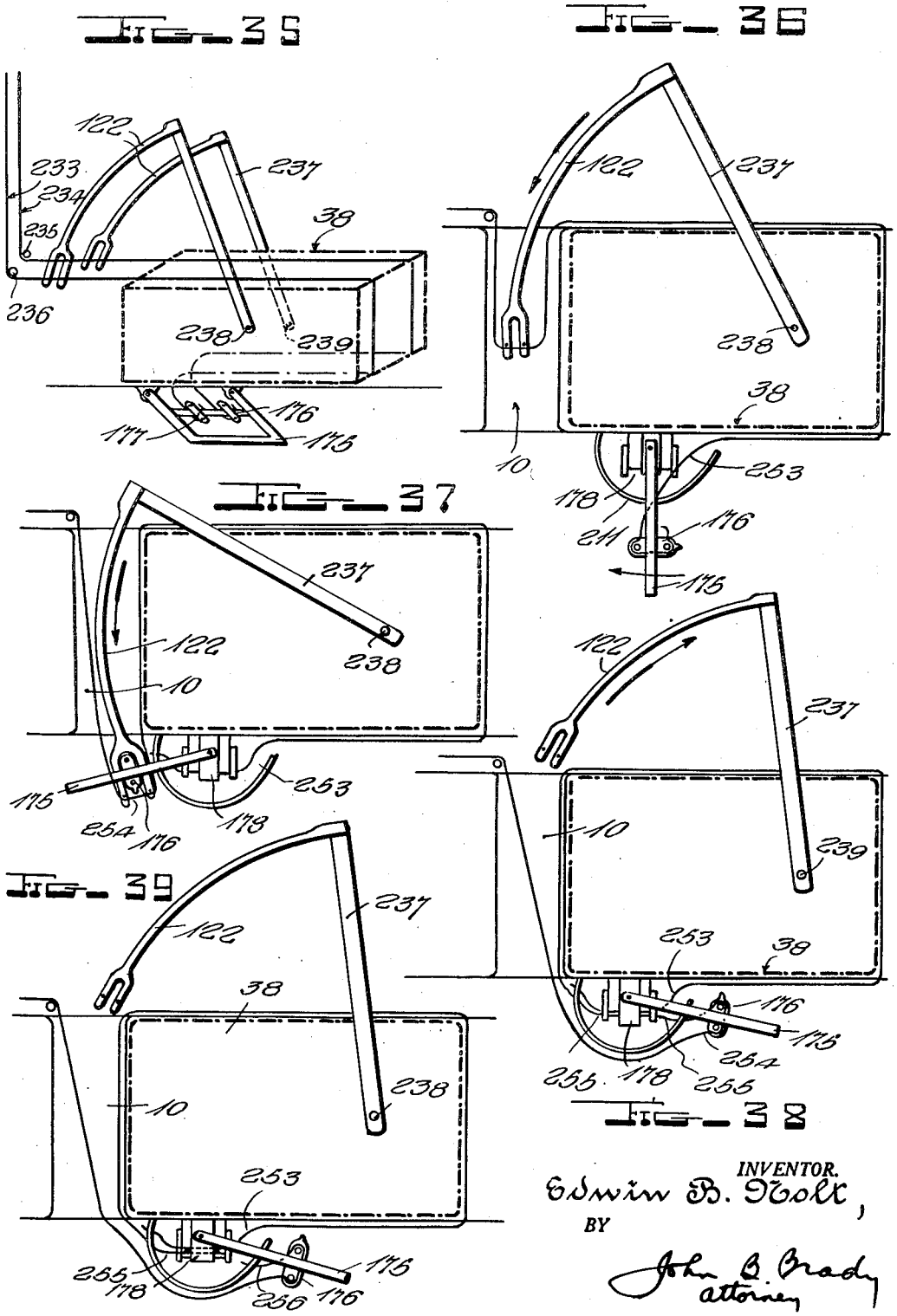

2,528,538

UNITED STATES PATENT OFFICE 2,528,538

TYING MECHANISM FOR AUTOMATIC BALERS

Edwin B. Nolt, Ephrata, Pa., assignor, by mesne assignments, to The Sperry Corporation, New York, N. Y., a corporation of Delaware Application May 29, 1944, Serial No. 537,900

14 Claims. (Cl. 100—20)

1

My invention relates broadly to pick-up balers and more particularly to an improved and simplified construction of tying mechanism for bales delivered by pick-up balers.

One of the objects of my invention is to provide an improved construction of tying mechanism for automatically tying bales with wire twisted to secure the bale in compressed condition for successive delivery from the pick-up baler.

Another object of my invention is to provide a construction of improved wire guide and twisting mechanism operative with respect to successive bales delivered by an automatic baler for insuring the tight binding of material in compressed bales.

Still another object of my invention is to provide an improved mechanism for operating the metering wheel associated with a wire tie mechanism in a bale tying system for pick-up balers.

Other and further objects of my invention reside in the construction of mechanism for twisting the wire ends of bale ties around compressed material to be baled, as set forth more fully in the specification hereinafter following by reference to the accompanying drawings, in which:

Figure 1 is a slide elevational view of a pick-up baler employing the wire tying mechanism for bales in accordance with my invention; Fig. 2 is a slide elevational view of a fragmentary portion of the pick-up baler employing the bale tying mechanism of my invention looking at the side opposite the side of the pick-up baler illustrated in Fig. 1; Fig. 3 is a side elevational view on a larger scale of the wire guide parts of the bale tying mechanism showing the multiple tying arrangement which I provide; Fig. 4 is a top plan view of the wire guide mechanism illustrated in Fig. 3; Fig. 5 is a transverse sectional view taken on line 5—5 of Fig. 3; Fig. 6 is a transverse sectional view taken substantially on line 6—6 of Fig. 3; Fig. 7 is a transverse sectional view taken substantially on line 7—7 of Fig. 3; Fig. 8 is a side elevational view of one of the resilient holders for guiding the wire in the tying mechanism of my invention; Fig. 9 is a top plan view of the device shown in Fig. 8; Fig. 10 is a transverse sectional view taken on line 10—10 of Fig. 8; Fig. 11 is a vertical sectional view taken on line 11—11 of Fig. 9; Fig. 12 is a vertical sectional view taken on line 12—12 of Fig. 8; Fig. 13 is a side elevational view of one section of the wire guide device of Fig. 8; Fig. 14 is a vertical sectional view taken on line 14—14 of Fig. 8; Fig. 15 is a vertical sectional view through the wire tying head taken on line 15—15 of Fig. 4; Fig. 16 is an elevational view of the parts constituting the wire tying head with certain of the associated parts illustrated in section; Fig. 17 is a vertical sectional view of certain of the parts in the wire tying head with coacting parts illustrated in elevation for illustrating the manner of operation of the wire tie mechanism; Fig. 18 is an elevational view of one of the wire tying gear elements; Fig. 19 is a side view of the wire tying gear element illustrated in Fig. 18; Fig. 20 is a vertical sectional view taken on line 20—20 of Fig. 18; Fig. 21 is a side elevational view of a fragmentary portion of the mechanism which coordinates the mechanism for moving the compressed bales with the wire tying mechanism of Figs. 3–20; Fig. 22 is a vertical sectional view taken substantially on line 22—22 of Fig. 21; Fig. 23 is a horizontal sectional view taken substantially on line 23—23 of Fig. 21; Fig. 24 is a horizontal sectional view taken substantially on line 24—24 of Fig. 21; Fig. 25 is a fragmentary top plan view of the delivery end of the pick-up baler showing the arrangement of the bale tying mechanism with respect to the hydraulic means for compressing the bale during the bale tying operation; Fig. 26 is a detailed view showing a fragmentary end portion of the needle employed in the bale tying mechanism of my invention, parts being broken away to show the wire guide means in the yoked end of the needle; Fig. 27 is a side elevational view of the fragmentary end of the needle illustrated in Fig. 26 with parts thereof shown in longitudinal section on line 27—27 of Fig. 26; Fig. 28 is a transverse sectional view taken on line 28—28 of Fig. 26; Fig. 29 is a transverse sectional view taken on line 29—29 of Fig. 26 and looking in the direction of the end of the needle; Fig. 30 is a side elevational view of the wire guide means associated with the tying mechanism and illustrating the securing means for the wire ends preparatory to a tying operation; Fig. 31 is a fragmentary transverse sectional view taken on line 31—31 of Fig. 30 and showing the wire guide members in plan; Fig. 32 is a transverse sectional view through one of the wire guide members taken on line 32—32 of Fig. 30 and illustrating the wire securing means in section; Fig. 33 is an enlarged front elevational view of the wire cutting mechanism with certain of the parts broken away and illustrated in section; Fig. 34 is a side elevational view of the wire cutting mechanism illustrated in Fig. 33 with certain of the parts broken away and shown in section; Fig. 35 is a schematic view illustrating the initial arrangement of the parts of the tying mechanism preparatory to a wire tying operation;

Figs. 36, 37, 38, 39, 40, 41, 42 and 43 show successive steps in the bale tying operation.

Referring to the drawings in detail, reference character 1 designates the chassis structure of the pick-up baler which is supported in balanced relation on the transverse axis 2 of the wheeled support 3. The baler includes at one end the pivotally mounted frame structure indicated generally at 4 which constitutes the pick-up or gatherer portion of the mechanism as explained more fully in my co-pending application Serial No. 525,787 filed March 9, 1944, for Hay Gathering and Feeding Mechanism for Hay Balers, now Patent 2,507,540, issued May 16, 1950. The pick-up or gatherer is normally supported by the wheeled support represented at 5 suitably counterbalanced by springs represented at 6 and capable of being moved to an elevated position when it is desired to move the baler to the field. The pick-up mechanism is illustrated as including pick-up or gathering members 7 mounted on rotary carrier 8 for delivering the hay to the hay conveyor mechanism in trough structure 9 by which the hay is delivered to the receiving chamber indicated generally at 10 as located in front of the ram or plunger 11. The ram or plunger 11 reciprocates in the receiving chamber 10 within the confines of walls 12 for forcing the hay into compacting relation in the baling chamber. The plunger 11 is reciprocated under control of hydraulic operating mechanism shown generally at 16 and explained more fully in my co-pending application Serial No. 533,415 filed April 29, 1944, now Patent No. 2,396,720, issued March 19, 1946, entitled Hydraulically Controlled Baler. The movement of the plunger 11 is coordinated with the movement of the wad board 17 operated through lever mechanism 18 journaled on support 19 and controlled through the crank and operating arm 20. The control of the wad board is timed with the movement of the plunger 11 and with the mechanism for compressing the bale in bale tying position adjacent the rear of the baler as represented generally at 21. The several moving mechanisms are all controlled by the hydraulic system 16.

The bale compressing mechanism for securing the compacted bales delivered from the baling chamber while performing the tying operation comprises pairs of arms indicated at 22 and 23 which are pivotally mounted at 22a and 23a on the frame or chassis of the baler at 24 and 25. The arms 22 and 23 are thus free to be moved transversely of the chassis as represented more clearly in Fig. 25 under control of the hydraulic cylinder represented at 26. The hydraulic cylinder 26 is secured at one end by suitable means to the vertically disposed angular member or strip 28 which is secured adjacent opposite ends to the transversely extending rod members 29 and 30, as represented at 29a and 30a, which project horizontally of the frame of the baler through sets of guide lugs projecting upwardly and downwardly from the rear end of the frame of the baler. Opposite ends of rod members 29 and 30 project beyond the sets of guide members and are secured at their ends 29b and 30b to the vertically extending angular strip 33 which bears directly against the pivotally mounted longitudinal extending arms 22.

The two horizontally extending rod members 29 and 30 serve as carriers for the movable plate 34 which bears directly against the angularly movable arms 23 on one face and is attached centrally to a connecting rod which leads to a piston which is operable in hydraulic cylinder 26. The introduction of the operating fluid to the interior of cylinder 26 results in the ejection of the piston therein thereby serving to spread plate 34 with respect to strip-like member 28 and resulting in the movement of strip-like member 33 against angularly movable arms 22 while plate 34 bears against arms 23. The conjoint action is such as to shift arms 22 and 23 inwardly for securing the bale which I have indicated in dotted lines at 38 in Figs. 35–43 while the bale is in bale tying position. The bale that is clamped by arms 22 and 23 serves as the confining header against which the hay for the succeeding bale which is forming in the hay baling chamber 10 is compacted by plunger 11.

Pipe line 41 extends from the hydraulic system 16 as illustrated more clearly in Fig. 1. Suitable supports extend from the chassis of the baler for mounting the pressure conveying pipe line 41 in position longitudinally of the chassis of the baler in a protective position for insuring against breakage of the pipe line. In Fig. 1 I have schematically illustrated pipe line 41 in order to clearly show the coordination between the hydraulic bale clamping means and the hydraulic system, but it will be understood that in actual practice pipe line 41 is confined directly against the chassis of the baler.

The successive bales are formed one against another and successively tied and discharged from the end of the baler. The details of the hydraulic mechanism for controlling the forward and reverse strokes of the plunger are set forth at length in my aforesaid Patent No. 2,396,720, and will not be repeated herein except to point out that the advancement of the bales through the baler progresses as plunger 11 accumulates and successively packs quantities of hay into the baling chamber.

The metering wheel 98 is gradually rotated by the gradually accumulated material in the baling chamber. The shaft 97 to which the metering wheel 98 is keyed carries at one end a trip member or cam shaped device 99. When the desired length of bale is reached the metering wheel 98 has turned so that the trip or cam 99 engages the roller member 100 carried by rod member 101. The rod member 101 is connected through link 101a to the over center mechanism 103 and pulls one of the lever members 103a of the over center mechanism 103 until over center spring 106 goes over center. Over center spring 106 puts pressure on lever 103b of the over center mechanism 103. A lug 107 welded on rod 108 which is connected to lever 103b rests on slide 109. The plunger 11 at end of the reverse stroke pulls slide 109 back until lug 107 on rod 108 drops past slide 109 due to downward pressure of spring 106 on rod 108. At the same time that lug 107 passes the end of slide 109, lever 103b pulls rod 101b which in turn compresses spring 101c. Spring 101c puts a horizontal pressure on dog 102 that is operated by shaft 112, journaled vertically with respect to the side wall 12 of the baler, and which projects through slot 102a in the wall 12 of the baler into the path of plunger 11. When plunger 11 passes dog 102 moving toward the baling chamber, the dog 102 moves in behind the plunger due to the force of spring 101c. When rod 108 moves down it carries with it lever 115 journaled at 116 which in turn operates lever 117 on the opposite side of the baler which holds the plunger 11 in its extreme forward position as set forth in Patent No. 2,396,720 on the Hydraulic Controlled Baler supra.

When dog 102 moves into a position in the path of the plunger 11, shaft 112 to which it is connected turns and moves crank arm 112a which moves lever 112b. When lever 112b moves it releases dog 167 thus engaging clutch 149. Clutch 149 operates a crank 149a which in turn operates connnecting rod 150. Connecting rod 150 is connected to gear rack 168. When rack 168 moves forward it engages gear 169 which is keyed to shaft 170. To shaft 170 are keyed two cranks 171 and 172. To the ends of these cranks there are fastened connecting rods 173 and 174 which connect to yoke 175 which carries wire holders 176 and 177.

The yoke 175 is pivoted at 175a and 175b to the side wall 12 of the baler and swings around the wire guides 211 and 212. The wire guides 211 and 212 carry wire holders adjacent the juncture of slots 213 and 214 with the supporting frame of the baler at 12 on the wire entry side of the tying mechanism. The wire holders shown more clearly in Figs. 30–32 comprise plates 265 and 266 secured to the adjacent wire guides 211 and 212 on one of the co-acting pairs of wire guide members and extending toward the other of the coacting pairs of wire guide members. The plates 265 and 266 are serrated or notched on their edges as indicated at 265a and 266a directed away from the direction of pull of the wire during the period that the wire is being laid in the wire tyer. Coacting spring strips 267 and 268 are supported on the frame 12 of the baler and project across the notched edges 265a and 266a, serving as a securing means for the end of the baling wire 253 when it is laid in the wire tyer on the first sweep of yoke 175 (see Fig. 36).

When rack 168 moves forward the yoke 175 is swung in an arc through the system of cranks and rods as hereinbefore explained. The yoke 175 carries the wire holders 176 and 177 which places the wire in the twister 178. When yoke 175 swings to forward position the needles 122 move through the baling chamber 10 and carry with them the free end of the baling wire. As yoke 175 reaches forward position the needles 122 pass through slots 122a in baling chamber 10 carrying with them the free end of the baling wire. When yoke 175 starts to swing in reverse direction the wire holders 176 and 177 pick the free end of the wire off the needles 122 and carry it back placing it in twister 178.

When the yoke 175 swings in the forward direction the clutch 149 makes ¼ turn. The yoke 175 swings back in the reverse direction in the next ¼ turn of the clutch 149 leaving shaft 170 in its original position. When clutch 149 starts the second half of its revolution it moves rack 168 back causing it to mesh with pinion 179 which is keyed to shaft 180 journaled with respect to the side wall 12 of the baler. Keyed to the other end of shaft 180 is a miter gear 181. From miter gear 181 is driven shaft 182 through miter gear 182a which operates twister 178. The twister 178 operates while clutch 149 is going from 180°–270° of its turn. When the clutch goes from 270°–360° of its turn it just pulls the rack 168 back and turn the twister 178 back empty.

Starting again with the start of clutch 149, during the first quarter turn of crank 149a it draws rack 168 forward. The front end of rack 168 moves lever 183 ahead. Lever 183 is connected to rod 184, which in turn is connected to crank 185 journaled at 186. The crank 185 connects to rod 187 which in turn connects to crank 188. Crank 188 is fastened to shaft 189. When lever 183 is moved ahead as hereinbefore explained it turns shaft 189 through the system of levers and cranks as explained. To shaft 189 are fastened two levers 190 and 191 on opposite sides of the wire twister 178 which make contact with the wire ejectors. The levers 190 and 191 move the wire ejectors back making it possible for wire to enter the twister 178.

When clutch 149 nears the end of 270° of travel the two lugs 192 and 193 carried on the head 194, driven by connecting rod 150, strike limit nuts 195 and 196 on rods 197 and 198. The rod 197 is connected to lever 185 and from there to the wire ejectors as hereinbefore explained. Now when the lug 192 on head 194 makes contact with limit nut 195 on rod 197 and moves rod 197 back which in turn is connected to parts 180, 187, 188, 189, 190 and 191, this moves the wire ejectors out thus shoving the finished twisted wire out of twister 178. Also, at same time as this occurs, lug 193 on head 194 makes contact with limit nut 196 on rod 198 and moves rod 198 back thus moving lever 199 to which it connects. Lever 199 pivots about point 200 on the brace 201 supported on the side wall 12 of the baler. The top of lever 199 is pivotally connected to bar 202 at 203 which is in turn fastened to rod 101 at point 204. Now as the lower end of lever 199 is pulled back by rod 198 the upper end moves forward and this pulls the end of lever 103a of over center 103, through link 101a, up throwing spring 106 over center in the original position. When spring 106 goes over center it pulls lever 103b up which in turn lifts rod 108 and rod 108 pulls levers 115 and 117 to their original position, operating rod 118 leading to the hydraulic control mechanism for controlling the reciprocative stroke of the plunger 11.

The operating mechanism as heretofore described and particularly shown in Figs. 21–24 has the effect of imparting rotary movement to shaft 182 and oscillating movement to shaft 189. The conjoint action of these two shafts operates the wire twister 178 as will be more clearly understood by reference to Figs. 3–20. The wire twister 178 comprises a housing formed by the casting 205 which projects from the wall 12 of the baler and side wall coacting closure 206 forming a housing in which the wire twister members 207 and 208 are journaled and within which intermeshed gears 209 and 210 operate. It will be seen that the wire twister members 207 and 208 each contains a radially extending slot 207a and 208a adapted to be in line and registered with the coacting slots 207b and 208b in the body structure 205 of the wire twister and with the sets of wire guide members 211 and 212 which extend along substantially semi-circular paths along the wire twister. The sets of wire guides 211 and 212 are each provided with an intermediate slot 213 and 214 through which the wire is introduced preparatory to the twisting operation. The rotary movement is imparted to wire twister members 207 and 208 through gears 209 and 210 driven from shaft 182 upon which gear 209 is keyed. It will be observed that gear 210 is loose upon shaft 189 so that shaft 189 is free to oscillate through the concentrically disposed gear 210 although gear 210 is driven by gear 209 to impart movement to wire twister member 208. The shaft 189 which extends through the wire twister 178 and oscillates therein carries the levers 190 and 191 each of which is slotted as represented, for example, at 190a and 191a to engage pins 190b and 191b which project on opposite sides of the wire ejector member represented at 215. The wire ejector member 215 is free to reciprocate through the body structure of the wire twister. Wire ejector member 215 contains cam faces 215a and 215b for sliding the wire out of the coacting slots of the wire twister members at 207a and 208a and free of the coacting slots 207b and 208b in the body structure 205 from which the twisted wires are free to move over the ends of the body structure 205 and 205a and 205b where the twisted wire passes through the slots 216 and 217 to directly embrace the side of the compacted bale. Before the twisted wires are released through the slots 216 and 217 the free ends of the twisted connection thereof are cut by means of the cutting device represented generally at 218.

Figs. 33 and 34 show more clearly the cam member 229 connected to shaft 182. When shaft 182 is going from 270°–360° of its turn cam member 229 strikes cam roller 230 on disc 223 which is pivotally mounted at 224, thus imparting angular movement to disc 223 for effecting ejection of the cutting knives 221 and 222 during the last ¼ turn of twister drive gear 209.

The cutting device 218 comprises a pair of anvil members 219 and 220 each of which is slotted to receive the end of one of the wires constituting the twisted pair immediately adjacent the end of the twisted connection. The slotted anvils 219 and 220 within which the wire extends are each provided with faces through which reciprocative cutting knives 221 and 222 are adapted to be projected. The projecting mechanism consists of an angularly shiftable disc 223 pivotally mounted at 224 and forming a pivotal connection for link members 225 and 226 which extend to pivotal connections with the cutting knives 221 and 222 respectively. The disc 223 is normally biased by spring member 227, extending between a fixed point on the wire twister mechanism and the end of lever 228, to a position in which the cutting knives 221 and 222 are retracted from the slotted anvils 219 and 220.

Cam 229 is directly connected to shaft 182 which carries main twister drive gear 209. When shaft 182 turns it also turns cam 229 which strikes the cam roller 230 on disc 223 during the last one-quarter turn of twister drive gear 209 and thus the wire is cut before the twist is completely finished. The oscillating levers 190 and 191 control the movement of the wire ejectors 215. The cam 229 performs its operation and the cutting knives 221 and 222 are ejected and complete their function before the oscillating levers 190 and 191 operate. The wire is cut before the ejectors operate.

The wire for binding the bales is carried on reels represented at 231 and 232 in Fig. 1 depending from the chassis of the baler. The reels are journaled on bracket members mounted on the frame of the baler in such arrangement that they may be readily renewed or replaced from time to time as necessary. Tubular members 233 and 234 are supported on the chassis of the baler for directing each wire to the position at which the wire is effectively supplied to the bale tying mechanism as represented in Fig. 1. That is to say, tubular member 233 terminates at a position 233a in alignment with the lower needle 122 while the tubular member 234 terminates at 234a substantially in alignment with the upper needle 122. The wires pass over guide rollers represented at 235 and 236 for engagement by rollers 122b and 122c carried in the bifurcated extremities in the yoked ends 122d of the needles 122. The needles 122 are supported by the yoke 237 pivoted at the top and bottom of the frame of the chassis as represented at 238 and 239. The yoke 237 is shifted angularly for controlling the movement of needles 122 under control of the adjustable links 240 connected to arms 241 driven by shaft 170. As the shaft 170 revolves, arms 241 move adjustable links 240 to swing yoke 237 through a path which results in the successive transverse movement of needles 122 with respect to the chassis.

For the purpose of gripping the baling wire I provide the wire holders 176 and 177 heretofore referred to. These wire holders are particularly novel in construction and are shown in detail in Figs. 8–14. The wire holders are supported on extensions 175c that project from yoke 175 and comprise a pair of spaced bolt members represented at 242 and 243 having their headed ends riveted in an end plate 244. The end plate 244 is substantially oval in shape with wire guide projections 245 and 246 thereon as shown. Projection 246 extends from the end of plate 244 and is directed upwardly for engaging the wire and by its inclined cam face 246a guiding the wire into the wire holder. Each of the bolts 242 and 243 has enlarged shanks 242a and 243a immediately below the riveted connections of the bolts with the plate 244 and forming suppressor members between the guide plate 244 and the supporting member 175c. The shanks 242a and 243a are each provided with annular grooves 242b and 243b which extend substantially more than the 180° around the peripheries of the shanks and serve as wire gripping means in coaction with the spring pressed plate member shown at 247. The spring pressed plate member 247 is shaped as shown in Figs. 8 and 9 to substantially conform with the shape of the upper plate 244 but having an upwardly directed end portion 247a and a downwardly directed end portion 247b serving as wire guide means in coaction with the shaped upper plate 244. The plate 247 is recessed at spaced intervals and receives ball members 248 which are retained therein and serve as wire confining means in coaction with the associated grooves 242b and 243b in the bolt members 242 and 243. Plate 247 is normally urged by coil springs 249 and 250 into a yieldable coacting relation to upper plate 244 so that wire guided into the grooves 242b and 243b tends to snap over the projections provided by balls 248 and to be releasably secured in the grooves 242b and 243b. The construction shown provides for yieldable movement between plate 247 and plate 244 whereby the spatial relation between these plates is changed as the baling wire is slipped in or removed from the wire holder. In order to insure the maintenance of substantial parallelism between plates 244 and 247, as the plate 247 tends to yieldably float on springs 249 and 250, I provide a pin member 251 which is co-extensive with projection 245 on plate 244 and tends to slide in a semi-circular peripheral notch 252 formed in the adjustable plate 247. Thus canting or angular tipping with possible subsequent wedging of the floating plate 247 is substantially precluded. I have explained the wire holders at length so that their ability to grip and pull the wire, when it is looped around the grooved posts 242a and 243a while being free to slide through the wire holder, will be more fully understood when considering the procedural steps in effecting the tying of a bale as depicted in Figs. 35-43.

In Fig. 35 I have illustrated the bale in perspective and have rotated the parts 90° out of normal position in order to make clear the position of the wires when the bale is being formed. It will be seen that both the upper and lower tying wires are initially secured in the wire holders 176 and 177 respectively on the yoke 175 and the wires drawn through the chamber in which the bale is being formed and around the bale represented at 38 by the swinging movement of yoke 175. At this stage in the cycle needles 122 are wholly outside of the frame of the baler as shown in Fig. 35. In the description of the views which follow I have described the tying operation with one set of the wires, but it will be understood that a second tie with another set of wires is performed simultaneously in a spaced position on the bale.

The next succeeding step is illustrated in Fig. 36 wherein the needles 122 are moved half way through the transverse slot in the head of the plunger 11 and in the space shown at 10. The yoke 175 has moved in timed relation half way through its angular path with the wires gripped in the wire holders 176 and 177. This is the start of the tying process as it will be seen that the free ends of the wires designated at 253 have been started to be laid in the wire twister 178 as shown.

In Fig. 37 I have shown the wire carrier or yoke 175 moved all the way front and the needles 122 have moved through the transverse slot in the head of the plunger ready for the wire carrier to pick the wire off the needles on the return stroke. The free end of the wire 253 has now been fully laid in the wire twister 178 as shown in Fig. 37 having become free of the wire holder 176. The wire holders 176 and 177 are moved into the path of the wires supplied from reels 231 and 232 and after being freed of the free end of the wire 251 picks up the looped portion of the wire at 254 removing the wire from the needles 122 so that when the yoke 175 reverses its direction of movement in the succeeding cycle illustrated in Fig. 38 the looped portion of the wire 254 is laid in the wire twister 178 as illustrated in Fig. 38.

Fig. 38 illustrates the condition where the wires engaged in the wire holders 176 and 177 may slip through the holders as the loop of wire at 254 is being advanced for laying the wire in the wire twister 178 as represented at 255 ready for the twisting operation.

Fig. 39 illustrates the position of the mechanism at the commencement of the wire twisting operation.

In Fig. 40 I have shown the ends of the wire at 253 and 255 twisted in the wire twister 178 and the end of the wire 255, after twisting, cut or severed by the cutter represented at 221 in Fig. 17 leaving the free end of the wire at 256 carried in the wire holder 176. It will be observed that the twisted loop of wire is now in the form of a band entirely encircling the bale 38 which is confined and compressed under very substantial pressure. This in effect binds the wire twister 178 to the bale.

However, as represented in Fig. 40 the twisted ends of the wire in the wire twister 178 are now ready for ejection from the wire twister. Such ejection is accomplished by the operation of the ejector means 215 which pushes the twisted wire 253—255 out from the wire twister 178.

As shown in Fig. 41 the twisted wire 253—255 springs over the top of the ejector 215 (Fig. 16) and passes through slot 216 to a position directly against the compressed bale 38.

The compressed bale as soon as it is delivered from the baler is free to expand and resume such a size as will fill the area within the wire bond.

In Fig. 42 I have shown the position of the parts at the start of the binding operation on the succeeding bale as bale 38 is pushed out of the baler. As bale 38 is ejected from the baler in the direction of arrow 257 the succeeding bale being formed at 258 is packed against the head formed by bale 38. The looped wire secured in the wire holder 176 is pulled back, as represented at 259, over the twister 178 as the material accumulates in the baling chamber for forming bale 258.

Fig. 43 shows the wire at 259 completely pulled over the twister 178 and wrapped around pin 260 projecting from extension 175c on yoke 175 so far as the upper wire is concerned and around a corresponding pin indicated at 261 on extension 175c adjacent the lower wire holder 177 (Fig. 3). The wires are held in this position until yoke 175 with the wire carriers 176 and 177 thereon supporting the free ends of the wires starts forward again to tie another bale through the succession of events in the cycle which repeats in the order of Figs. 35 through 43 inclusive.

Thus successive bales are automatically tied in repeating cycles timed in relation to the operation of the twister. One of the important features to be carried in mind in understanding the operation of the tying mechanism is the complete rotation of control shaft 182 as distinguished from the oscillatory movement of control shaft 189 whereby twisting of the ends of the wire may be effected and the twisted wire ejected in proper timed relation to the severing of the free end of the wire by knife members 221—222 operating in coordination with anvils 219 and 220. Throughout the description of the successive steps outlined in Figs. 35-43 I have shown but one of the tying wires in position on the baler, but it will be understood that both tying wires are applied in similar manner at upper and lower zones of the baler.

I have described my invention in one of its preferred embodiments but I realize that changes in the arrangement of parts may be made and modifications effected and I desire no limitations imposed upon my invention other than those set forth in the appended claims.

What I claim as new and desire to secure by Letters Patent of the United States is as follows:

1. A bale tying mechanism comprising a pair of wire supply reels, an angular swingable yoke having wire holders disposed thereon at spaced intervals, wire twisting mechanism having a pair of twister members disposed at spaced intervals thereon, a set of wire guide means aligned with each of the wire twisters, said yoke being swingable in a forward direction for laying the free ends of the wires secure in the said wire holders carried thereby in each of the wire twisters, the said wire holders operating to release the free ends of the wires substantially at the end of the forward stroke thereof, needle mechanism for wrapping the wires around a bale and delivering loops thereon to a position adjacent said yoke substantially at the end of the forward stroke thereof for engagement by the wire holders carried by said yoke, said yoke being swingable in a return stroke for introducing the wires carried by the wire holders into said wire twisters in a direction opposite to the direction in which said free ends of the wires were introduced into the wire twisters, means for operating said wire twisters, means for severing the looped ends of the wires carried by said wire holders, means disposed between said wire twisters for simultaneously actuating said means for severing the looped ends of the wire carried by said wire holders, and coacting means for simultaneously ejecting the twisted wires from said wire twisters for encircling the formed bale.

2. A wire tying mechanism for bales comprising a frame structure and comprising a housing, a pair of coacting gears mounted in said housing, a wire twister disposed adjacent each of the opposite ends of said housing, each wire twister having a slotted recess in one side thereof and having gear teeth engaged with the aforesaid coacting gears, said housing being formed with slots in registration with the slotted portions of said wire twisters when the latter are at rest, a wire ejector slidably mounted with respect to said housing, means for introducing opposite ends of wire to be twisted through the slots in said housing and into the slotted portions of said wire twisters, a shaft member for rotatably driving one of said gears for twisting the ends of the wires introduced into said wire twisters, and an oscillating shaft extending through the other of said gears and interconnected with said wire ejector and operating in timed relation to said other shaft whereby the twisted wire ends are ejected from said wire twisters upon completion of the twisting operation therein.

3. Wire holding means for bale tying mechanism comprising a support, a plate member having an upwardly projecting wire guide adjacent one end thereof, a pair of supporting members connected with said plate member and said support, said supporting members having transverse grooves therein immediately below said plate member, a floating plate carried by said supporting members, and yieldable means for maintaining said floating plate in close proximity to the under surface of said plate member 4. Wire holding means for bale tying mechanism comprising a support, a plate member having an upwardly projecting wire guide adjacent one end thereof, a pair of supporting members connected with said plate member and said support, said supporting members having transverse grooves therein immediately below said plate member, a floating plate carried by said supporting members, yieldable means for maintaining said floating plate in close proximity to the under surface of said plate member, and wire engaging means carried by said floating plate and directed toward said plate member.

5. Wire holding means for bale tying mechanism comprising a support, a plate member having an upwardly projecting wire guide adjacent one end thereof, a pair of supporting members extending from said support and connected with said plate member, wire engaging means on said supporting members, a floating plate yieldably mounted on said supporting members and movable in variable spatial relation to the entire surface of said plate member, resilient means for supporting said floating plate, and wire engaging means carried by said floating plate and coacting with the wire engaging means on said supporting members.

6. Wire holding means for bale tying mechanism comprising a support, a plate member having an upwardly projecting wire guide adjacent one end thereof, a pair of supporting members extending from said support and connected with said plate member, wire engaging means on said supporting members, a floating plate yieldably mounted on said supporting members and movable in variable spatial relation to the entire surface of said plate member, resilient means for supporting said floating plate, wire engaging means carried by said floating plate and coacting with the wire engaging means on said supporting members, and means extending between said plate member and said floating plate for maintaining substantial parallelism between said floating plate and the under surface of said plate member in the course of the yieldable movement of said floating plate.

7. A bale tying mechanism comprising a pair of wire supply reels, an angular swingable yoke having wire holders disposed thereon at spaced intervals, wire twisting mechanism having a pair of twister members disposed at spaced intervals thereon, a pair of wire guide means substantially surrounding the wire receiving side of each of the wire twisters, said yoke being swingable in a forward direction in a curved path substantially conforming with the contour of said wire guide means for laying the free ends of the wires secured in the said wire holders carried by the yoke in each of the wire twisters, the said wire holders operating to release the free ends of the wires substantially at the end of the forward stroke of said yoke, needle mechanism for wrapping the wires around the bale and delivering loops thereof to a position adjacent said yoke substantially at the end of the forward stroke thereof for engagement by the wire holders carried by said yoke, said yoke being swingable in a return stroke for introducing the wires carried by the wire holders into said wire twisters in a direction opposite to the direction in which said free ends of the wires were introduced into the wire twisters, means located between said wire twisters for severing the looped ends of the wires carried by said wire holders, and coacting means for ejecting the twisted wires from said wire twisters for encircling the formed bale.

8. A wire tying mechanism for bales comprising a frame structure and comprising a housing, a pair of coacting gears mounted in said housing, a wire twister disposed adjacent each of the opposite ends of said housing, each wire twister having a slotted recess in one side thereof and having gear teeth engaged with the aforesaid coacting gears, said housing being formed with slots in registration with the slotted portions of said wire twisters when the latter are at rest, a substantially E shaped wire ejector slidably mounted with respect to said housing, means for introducing opposite ends of wire to be twisted through the slots in said housing and into the slotted portions of said wire twisters, a shaft member for rotatably driving one of said gears for twisting the ends of the wires introduced into said wire twisters and an oscillating shaft extending through the other of said gears and interconnected with said substantially E shaped wire ejector and operating in timed relation to said other shaft whereby the twisted wire ends are ejected from said wire twisters upon completion of the twisting operation therein, and means for directing the twisted wire to a position encircling the bale.

9. Bale tying mechanism comprising in combination a chamber for accumulating material to be baled, means for compressing baled material, means for encircling wire around the baled material, a wire twister adjacent one side of the chamber, said chamber being slotted longitudinally of the side adjacent the wire twister, said wire twister operating to receive and twist the wire encircling the baled material, a cam mechanism driven in timed relation to said wire twister, a reciprocating knife actuated by said cam mechanism in a path normal to the path of movement of the wire through the wire twister and operating to sever the supply end of the wire, and means for ejecting the twisted wire whereby the wire is freed for passage through the slotted side of the chamber for encircling the baled material, the compressed bale being free to expand within the limits of the encircling twisted wire.

10. Bale tying mechanism comprising means for successively packing material to be baled into compressed relation constituting separate bales, a movable needle operating in timed relation to the forming of the bales and movable in a path transverse to the axis of the bales for encircling the formed bales with loops of securing wire, a wire twister adjacent one side of a formed bale, means operating in timed relation to the movement of the bale for introducing one end of the looped wire into one end of the wire twister, a bifurcated end portion on said needle for directing another portion of the wire into said last mentioned means for introducing the last mentioned portion of the wire into said wire twister, means for twisting the wire to form a twisted bond encircling the formed bale, a rotatably driven cam operating in timed relation to the twisting operation, a knife reciprocative across the path of the supply end of the wire extending from said wire twister, means operated by said cam for thrusting said knife across the path of the supply end of the wire for severing the looped portion of the wire remote from the twisted portion thereof, and means for ejecting the twisted bond for encircling the formed bale.

11. Wire tying mechanism for bales comprising, a wire guide disposed adjacent one side of a formed bale, wire twisting mechanism disposed adjacent said wire guide, a yoke member pivoted to swing in a path adjacent said wire guide, a wire holder carried by said yoke member in alignment with said wire guide, said wire holder including means for gripping and pulling a wire for delivery to said wire twisting mechanism, said mechanism including a rotatably driven cam, slotted anvil for the passage of a tying wire, a reciprocative knife operative in timed relation with the advancement of a bale, needle mechanism for encircling the bale with wire and introducing the ends thereof into said wire holder for delivery to the wire twisting mechanism for effecting the bale tying operation, and means for advancing the formed bale and moving said yoke member in timed relation thereto.

12. Bale tying mechanism comprising in combination with means for advancing a compressed bale along a horizontal guide, a pair of control shafts, gear means operated in timed relation to the advancement of the bale for imparting rotary movement to one of said control shafts and oscillatory movement to the other of said control shafts, wire supply means for supplying wire to said bale tying mechanism, a wire twister operated by the rotary movement of the first of said control shafts, means for introducing a wire encircling the formed bale into said wire twister, a wire ejector operated by the oscillatory movement of the other of said control shafts, and wire cutting means operated in timed relation to the first of said shafts for severing the wire from said wire supply means.

13. Bale tying mechanism comprising in combination with means for advancing a compressed bale along a horizontal guide, a pair of control shafts, gear means operated in timed relation to the advancement of the bale for imparting rotary movement to one of said control shafts and oscillatory movement to the other of said control shafts, a wire twister operated by the rotary movement of the first of said shafts, means operating in synchronism with the advancement of the bale for encircling the bale with wire and introducing the ends thereof into said wire twister for effecting the bale tying operation, a wire ejector operated by the oscillatory movement of the other of said control shafts, and wire severing means operating in timed relation to the operation of the first of said shafts.

14. Bale tying mechanism comprising in combination with means for forming a bale, a gear operated system, needle mechanism operating transversely of the means for forming the bale for encircling the bale with wire, a wire holder means for introducing opposite ends of the wire into said wire twister, a wire ejector, a pair of control shafts, means for rotatably driving one of said control shafts for operating said wire twister, means for imparting oscillatory movement to the other of said control shafts for operating said wire ejector, a wire cutter actuated by the first mentioned control shaft for severing the supply end of the wire from the twisted wire after a wire twisting operation, and means for synchronizing the operation of said needle mechanism and all of the aforesaid means with the rate of advancement of the formed bale.

EDWIN B. NOLT.

REFERENCES CITED

The following references are of record in the file of this patent:

UNITED STATES PATENTS

| Number | Name | Date |
|---|---|---|
| 894,876 | Clark | Aug. 4, 1908 |
| 994,662 | Schubert | June 6, 1911 |
| 1,297,450 | Davis | Mar. 18, 1919 |
| 1,534,359 | Collins | Apr. 21, 1925 |
| 2,277,394 | Everhart et al. | Mar. 24, 1942 |
| 2,355,644 | Haase | Aug. 15, 1944 |
| 2,355,647 | Haase | Aug. 15, 1944 |